(12) United States Patent
Crohas et al.

(10) Patent No.: US 8,893,051 B2
(45) Date of Patent: Nov. 18, 2014

(54) METHOD FOR SELECTING AN ELEMENT OF A USER INTERFACE AND DEVICE IMPLEMENTING SUCH A METHOD

(75) Inventors: Henri Crohas, Verrieres-le-Buisson (FR); Raul Mallart, Paris (FR)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/521,337

(22) PCT Filed: Dec. 13, 2011

(86) PCT No.: PCT/FR2011/052964
§ 371 (c)(1),
(2), (4) Date: Jul. 10, 2012

(87) PCT Pub. No.: WO2012/136901
PCT Pub. Date: Oct. 11, 2012

(65) Prior Publication Data
US 2014/0026097 A1     Jan. 23, 2014

(30) Foreign Application Priority Data
Apr. 7, 2011   (FR) ...................................... 11 53043

(51) Int. Cl.
*G06F 3/048*   (2013.01)
*G06F 3/0482*   (2013.01)
*G06F 3/0488*   (2013.01)
*G06F 3/0481*   (2013.01)
*G06F 3/0484*   (2013.01)

(52) U.S. Cl.
CPC .......... *G06F 3/0482* (2013.01); *G06F 3/04883* (2013.01); *G06F 3/0488* (2013.01); *G06F 3/0481* (2013.01); *G06F 3/04842* (2013.01); *G06F 2203/04805* (2013.01); *G06F 2203/04808* (2013.01)

USPC ............ 715/860; 715/810; 715/822; 715/823

(58) Field of Classification Search
CPC ....................................................... G06F 3/0482
USPC .................................. 715/810, 822, 823, 860
See application file for complete search history.

(56) References Cited

U.S. PATENT DOCUMENTS

| | | |
|---|---|---|
| 2002/0160817 A1* | 10/2002 | Salmimaa et al. ............ 455/566 |
| 2003/0007006 A1* | 1/2003 | Baar et al. .................... 345/767 |
| 2006/0022955 A1 | 2/2006 | Kennedy |
| 2006/0132460 A1 | 6/2006 | Kolmykov-Zotov et al. |
| 2007/0198950 A1 | 8/2007 | Dodge |
| 2008/0136785 A1 | 6/2008 | Baudisch et al. |
| 2008/0222558 A1* | 9/2008 | Cho et al. ...................... 715/784 |
| 2010/0333018 A1 | 12/2010 | Numazaki |
| 2011/0018806 A1* | 1/2011 | Yano ............................. 345/163 |
| 2011/0025718 A1 | 2/2011 | Takarabe |

* cited by examiner

*Primary Examiner* — Andrey Belousov
(74) *Attorney, Agent, or Firm* — Duft Bornsen & Fettig LLP

(57) ABSTRACT

A method for selecting at least one element of a user interface on an electronic unit, including a step during which an action of an initialisation tool, positioned into an initialisation position on the user interface on the unit, triggers a display of a virtual magnifier encompassing the initialization position; and then a step during which an action of a validation tool triggers a display in the magnifier of a cursor centered on the initialization position; and then a step during which any movement of the validation tool causes an identical movement of the cursor and the virtual magnifier on the interface and which depends on the movement of the validation tool; and then a step during which at least one element of the interface is selected when the validation tool is picked up from the interface or that a selection tool is put onto the interface.

14 Claims, 2 Drawing Sheets

METHOD FOR SELECTING AN ELEMENT OF A USER INTERFACE AND DEVICE IMPLEMENTING SUCH A METHOD

TECHNICAL FIELD

This invention relates to a method for selecting elements of a user interface. It also relates to a device implementing such a method.

The field of the invention is more particularly, but not limited thereto, that of computers comprising a touch interface.

BACKGROUND

The use of touch screens is rapidly growing in portable equipment. This equipment has extremely variable screen sizes from 2 inches to more than 12 inches in diagonal. The resolution of these screens is increasingly finer and is now comparable to that of conventional computer screens. This equipment relies on graphic interfaces with which the user will interact, for example using his/her fingers instead of a mouse to point, click, and select elements of the user interface.

One feature of this operating mode is that the pointing accuracy is low because the contact area of a finger on the interface is relatively great, in the order of $\frac{1}{2}$ cm$^2$. Generally, to compensate for this lack of accuracy, user interfaces are specifically designed for this equipment. Thus, buttons have greater dimensions than for a conventional computer and are more spaced on the user interface.

One function of these apparatuses is to replace a conventional computer for more and more numerous tasks and in particular Web access, writing messages (email), texts, etc. Therefore, situations occur in which applications designed for a conventional computer have to be supported or more simply Web sites designed for a conventional computer should be accessed.

In both cases, there is the problem of the pointing accuracy of the mouse. Different embodiments of a method for selecting an element of a user interface as well as different devices implementing such modes are known.

It is known the solution of Apple® implemented in the iPhone® for text editing areas where, to position the cursor, after pressing a finger on the screen for a long time, the area under the finger is reproduced zoomed above the finger. The user can, by moving his/her finger, position the cursor accurately. Accordingly, there is the problem of access on top of screen which is annoying when the virtual magnifier exits the screen. Besides, this method only operates with some applications. For example, an element of a Web site cannot be accurately pointed when it has not intended to implement such a solution.

SUMMARY

The purpose of the present invention is to provide a method for selecting an element of a user interface and a device implementing such a method enabling to overcome at least one of the drawbacks of prior art which are reminded herein:
  the size of elements to be pointed can be smaller than the contact area of the finger on the screen;
  when a finger is put onto the screen it will mask displaying and the user cannot visually monitor what he/she is doing;
  the lack of accuracy in pointing elements having a small size;
  when a page is globally zoomed, the user loses the overview of the Web page, the application or the user interface;
  the difficulty in pointing interface elements located on the top edge of the screen when the Apple® solution for the iPhone® is used;
  the application has been designed for a PC and when it is attempted to use it on a portable apparatus with a touch screen, there is no version at different icon scales.

At least one of the abovementioned purposes is achieved with a method for selecting at least one element of a user interface characterised in that it comprises the following steps:
  a step during which an action of an initialisation tool, positioned into an initialisation position on the user interface, triggers a display of a virtual magnifier encompassing the initialisation position; and then
  a step during which an action of validation tool triggers a display in the magnifier of a cursor centred on the initialisation position; and then
  a step during which any movement of the validation tool causes an identical movement of the cursor and the virtual magnifier on the interface and which depends on the movement of the validation tool; and then
  a step during which at least one element of the interface is selected when the validation tool is picked up from the interface or when a selection tool is put onto the interface.

Preferably, the user interface is a touch screen.

Preferably, the movement of the cursor and of the virtual magnifier is a movement proportional to that of the validation tool.

Preferably, the element to be selected is smaller than an interaction surface of the initialisation tool on the user interface.

The action of the initialisation tool triggering the display of the virtual magnifier on the user interface can comprise positioning the initialisation tool into the same initialisation position, during a time higher than a time threshold.

The action of the initialisation tool triggering the display of the virtual magnifier on the user interface can comprise a sequence, said sequence comprising:
  positioning the initialisation tool into an initialisation position, and then
  picking up the initialisation tool, and then
  newly positioning the initialisation tool into the initialisation position or into a neighbouring position, this sequence being performed in a time period lower than a time interval threshold.

The validation tool can be the same as the initialisation tool. The action triggering the display of the cursor can be a movement of the initialisation tool on the user interface into a position the distance of which to the initialisation position is higher than a distance threshold.

A zooming factor of the magnifier can be determined as a function of a movement speed of the initialisation tool between the initialisation position and its position at the end of the action triggering the display of the cursor.

The validation tool can be different from the initialisation tool. The action triggering the display of the cursor can comprise the action of putting the validation tool.

To select at least one element of the interface, a specific selection can be generated depending on a relative pressing position of the selection tool with respect to the validation tool.

The generated specific selection can be a left click when the selection tool is on the left of the validation tool.

The generated specific selection can be a right click when the selection tool is on the right of the validation tool.

Preferably, a magnifying factor of the virtual magnifier is strictly higher than 1.

According to another aspect of the invention, it is provided a device for selecting at least one element of a user interface characterised in that it comprises:

means for triggering a display of a virtual magnifier encompassing an initialisation position on the user interface, by an action of an initialisation tool positioned into the initialisation position; and means for triggering a display in the magnifier of a cursor centred on the initialisation position by an action of a validation tool; and means for causing, for any movement of the validation tool, an identical movement of the cursor and the virtual magnifier on the interface, said movement being dependent on the movement of the validation tool; and means for selecting at least one element of the interface when the validation tool is picked up from the interface or when a selection tool is put onto the interface.

Preferably, the user interface is a touch screen.

Preferably, the means for causing, for any movement of the validation tool, an identical movement of the cursor and the virtual magnifier on the interface, are arranged for the caused movement of the cursor and of the virtual magnifier to be a movement proportional to that of the validation tool.

Preferably, the element to be selected is smaller than an interaction area of the initialisation tool on the user interface.

The action of the initialisation tool to trigger the display on the virtual magnifier on the user interface can comprise positioning the initialisation tool into the same initialisation position, for a time higher than a time threshold.

The means for triggering the display of the virtual magnifier on the user interface can be arranged to:

detect positioning of the initialisation tool into an initialisation position, and detect picking up of the initialisation tool, and detect new positioning of the initialisation tool into the initialisation position or into a neighbouring position, and trigger the display of the virtual magnifier if the positioning, the picking up and the new positioning are detected in a time period lower than a time interval threshold.

The validation tool can be the same as the initialisation tool. The action for triggering the display of the cursor can be a movement of the initialisation tool on the user interface into a position the distance of which to the initialisation position is higher than a distance threshold.

The device can further comprise means for determining a zooming factor of the magnifier as a function of a movement speed of the initialisation tool between the initialisation position and its position at the end of the action for triggering the display of the cursor.

The validation tool can be different from the initialisation tool. The action implementing the means for displaying the cursor can comprise the action of putting the validation tool.

The means for selecting at least one element of the interface can be arranged to generate a specific selection depending on a relative pressing position of the selection tool with respect to the validation tool, for example to reproduce a left click when the selection tool is on the left of the validation tool or to reproduce a right click when the selection tool is on the right of the validation tool.

Preferably, a magnifying factor of the virtual magnifier is strictly higher than 1.

BRIEF DESCRIPTION OF THE DRAWINGS

Further advantages and features of the invention will appear upon reading the detailed description of implementations and an embodiment in no way limiting, and the following appended drawings wherein.

DETAILED DESCRIPTION

In the rest of this description, by touch screen it is intended a user interface which combines displaying functionalities of a screen (monitor) and those of a pointing device, by physical interaction with this screen.

A touch screen can be implemented by different technologies. In a non-limiting way, these technologies can be the analog resistive technology, capacitive technology, strain gauge technology, analog-digital resistive technology, infrared technology, surface wave technology and/or NFI (Near Field Imaging) technology.

By "tool", it is meant herein any physical means capable of interaction (for example through pressure and/or capacitance) with the user interface in a given position of the interface, the tool being said positioned or put when it interacts with the interface and is said picked up in the opposite case. For example, a finger, stylus or pointer are tools used with tactile interfaces. In the case of NFI technology, a tool (for example a finger) can be not in direct contact with the interface and at the same time interact with the same. This technology enables a position of the tool on the tactile interface as well as the altitude coordinate of the tool ("z" axis) to be determined. According to the invention, the tool (finger) will be said put, but not necessarily in contact, when it is in interaction with the interface and otherwise picked up.

By virtual magnifier, it is meant a display magnified by a given factor of an area of the user interface. The magnifying factor is preferably strictly higher than 1 or can also possibly be equal to 1.

By element, it is meant any object displayed on the user interface. In a non-limiting way, an element can be for example an icon or even a link of a Web site.

A selection of at least one element enables a function related to the at least one element to be activated. In a non-limiting way, a function related to an icon can be an opening of a computer application, or even the display of a Web page, etc. A function related to several elements can be a selection of the same, for example for the purpose of moving them on a user interface. A selection can also result in at least the effect produced by a right or left click of a conventional mouse.

A first embodiment of a method according to the invention for selecting at least one element implemented on a user interface will now be described in reference to FIGS. 1 to 10.

Figure 1:
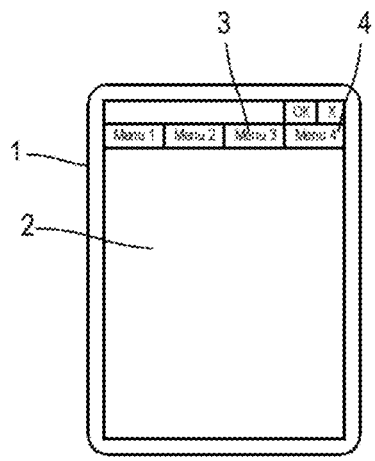
FIGS. 1 to 3 illustrate, in a method according to the invention, a step at the end of which an initialisation tool is put into an initialisation position onto the user interface and a step during which a virtual magnifier centred on the initialisation position is displayed on the interface.
Figure 2:
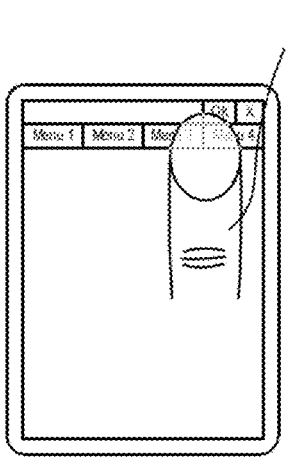
Figure 3:
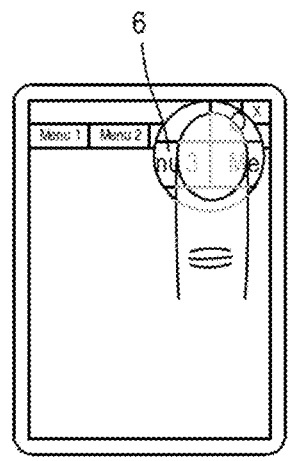

In reference to FIGS. 1 to 3, a step is described during which an action of an initialisation tool, positioned into an initialisation position on the user interface, triggers a display of a virtual magnifier encompassing the initialisation position.

In FIG. 1 can be seen a device 1, comprising a user interface 2, which is herein a touch screen. The device 1 further comprises an electronic unit. On the user interface 2 are displayed at least two elements 3 and 4. The user interface can for example implement a capacitive technology. In capacitive systems, a layer which accumulates charges is placed on the glass plate of the monitor. When a user touches the plate with his/her finger, some of these charges are transferred thereto.

In FIG. 2, all the elements of FIG. 1 are represented. Furthermore, an initialisation tool 5 which is herein a finger is put onto the user interface 2. The initialisation tool could also have been a stylus.

The initialisation action of this tool consists in this first embodiment in leaving the initialisation tool into the same initialisation position, for a time higher than a time threshold. Typically, the time threshold is substantially equal to 1 second. This time threshold is stored by the electronic unit.

In FIG. 3, all the elements of FIG. 2 are represented. Furthermore, the initialisation tool 5, positioned into an initialisation position on the user interface, triggers the display of a virtual magnifier 6 encompassing the initialisation position. The factor of the magnifier can be 1. It is preferably strictly higher than 1, as illustrated in FIG. 3. The zooming factor can depend on the pressure exerted by the initialisation finger. Instead of an initialisation finger pressing duration, it can be contemplated that the magnifier is displayed when the pressure of the initialisation finger is higher than some pressure threshold (also stored by the electronic unit), in the case of a resistive tablet.

In other words, FIGS. 1 to 3 illustrate the fact that when an initialisation tool is put onto the user interface into an initialisation position and remains put onto the initialisation position for a time longer than a certain threshold (also stored by the electronic unit), a virtual magnifier appears. This step can be seen as an initialisation step of the method.

In reference to FIGS. 4 to 6, a step during which an action of a validation tool triggers a display in the magnifier of a cursor encompassing the initialisation position will now be described.

Figure 4:
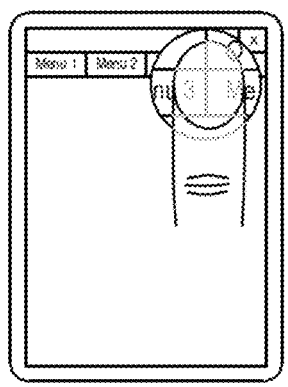
FIGS. 4 to 6 illustrate, in a method according to the invention, a step during which an action of a validation tool triggers a display in the magnifier of a cursor encompassing the initialisation position.

FIG. 4 comprises all the elements of FIG. 3. In this first embodiment, the validation tool is the initialisation finger. FIG. 5 comprises all the elements of FIG. 4. Furthermore, the initialisation tool 5 is observed to move on the user interface 2 as a vector 7.

Figure 6:
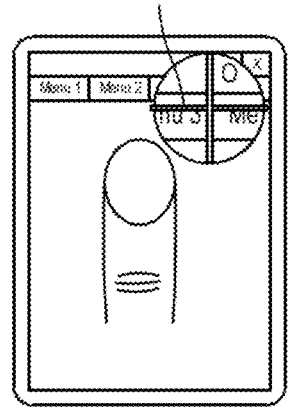

FIG. 6 comprises all the elements of FIG. 1. Furthermore, the validation tool is put onto the interface. In this first mode, the validation tool is the same as the initialisation tool. Furthermore, the virtual magnifier is displayed. Furthermore, in FIG. 6, a cursor 8 is observed to appear in the centre of the magnifier 6.

Herein, the action triggering the display of the cursor 8 is a movement, at an average movement speed, of the initialisation tool on the user interface into a position the distance of which to the initialisation position is higher than a distance threshold. Typically, the distance threshold is substantially equal to the minimum between one centimeter and ½₀ the diagonal of the user interface. This distance threshold is stored by the electronic unit.

The zooming factor of the magnifier can depend on different parameters among which the distance of the validation finger at the end of the step with respect to the initialisation position. For example, the zooming factor can increase when this movement speed increases.

Figure 5:
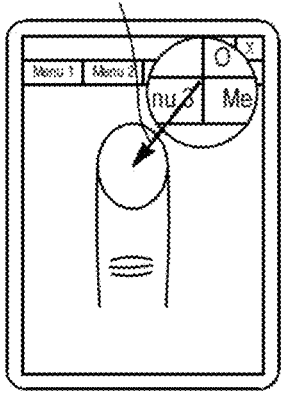

In other words, FIGS. 4 to 6 illustrate the fact that when the initialisation tool is moved after displaying of the magnifier and is farther from the initialisation position than a defined threshold stored by the electronic unit, a cursor is displayed onto the user interface, in the centre of the magnifier 6. This step can be seen as a step enabling the will of the user to continue the method to be validated and ends with the appearance of a cursor in the centre of the magnifier. The cursor will allow the targeting of the element to be selected.

In reference to FIGS. 7 to 9, a step during which any movement of the validation tool causes an identical movement of the cursor and the virtual magnifier on the interface will now be described.

Figure 7:
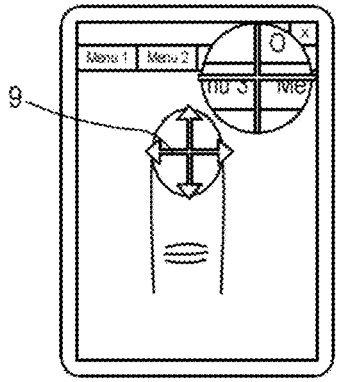
FIGS. 7 to 9 illustrate, in a method according to the invention, a step during which any movement of the validation tool causes a movement of the cursor which is identical to that of the virtual magnifier on the interface.

FIG. 7 comprises all the elements of FIG. 6, that is the device 1, a validation tool which is herein the same as the initialisation tool as well as the magnifier 6 and the cursor 8. Furthermore, a cross 9 is represented on the validation tool. This cross illustrates herein the possibility for the validation tool to move on the user interface 2. By doing so, the user moves the magnifier and the cursor.

Figure 8:
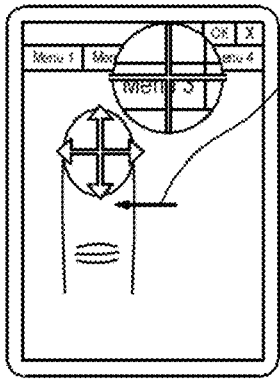

FIG. 8 comprises all the elements of FIG. 7. Furthermore, a movement, to the left, of the validation tool is represented by the arrow 10. Herein, FIG. 8 shows that the movements of the magnifier and the cursor, generated by the translation of the position of the validation tool on the screen are proportional to the movement of the validation tool. Herein, the identical movements of the magnifier and the cursor are finer in the virtual magnifier, while following the movement of the validation tool. The proportionality factor can be negative, which is the case when the movements of the magnifier and the cursor are opposite to the movement of the validation tool. It can also be equal to 1.

The zooming factor of the magnifier can also depend on different parameters among which the pressure exerted by the validation tool.

Figure 9:
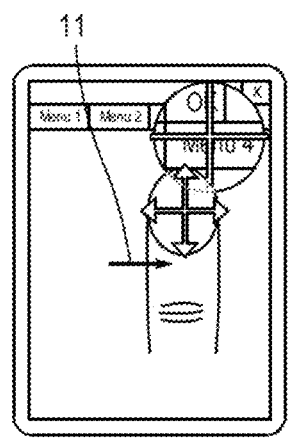

FIG. 9 comprises all the elements of FIG. 7. Furthermore, a movement, to the right, of the validation tool is represented by the arrow 11. Herein, the movements of the magnifier 6 and cursor 8 are also identical to each other. It is noted that when the magnifier is already at the edge of the screen, consequently, it is the image in the magnifier that is moving (herein, to the left) at the same time, proportionally to the movement of the validation tool in interaction with the user interface. The movement of the cursor and the virtual magnifier is null and only a zoomed display in the magnifier is moved proportionally to the validation tool.

In reference to FIG. 10, a step during which at least one element is selected when a validation tool is picked up from the interface will now be described.

Figure 10:
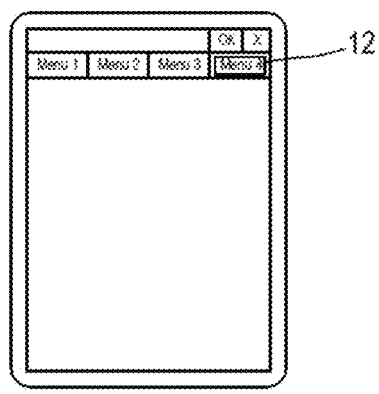
FIG. 10 illustrates, in a method according to the invention, a step during which at least one element is selected when the validation tool is picked up from the interface.

FIG. 10 contains all the elements of FIG. 1. In FIG. 10, the validation tool used in the preceding validation step, cf. FIG.

7, has been picked up and the element 4 has been selected as shown by the rectangle 12 surrounding it. It can be seen that the element which is selected, herein the element 5, is smaller than an interaction area of the validation tool with the user interface. Typically, the contact surface area of a finger is in the order of ½ cm². The finger can thus have a contact area greater than that of the element to be selected.

A first alternative embodiment of the invention just described in reference to FIGS. 11 to 13 will now be described, only for differences of this alternative from the preceding description. In this alternative, FIGS. 11 to 1 will replace FIG. 10.

Figure 11:
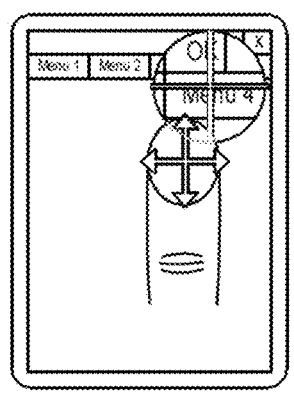
FIGS. 11 to 13 illustrate, in a method according to the invention, a step during which at least one element of the interface is selected when a selection tool, different from the validation tool, is put onto the interface.

FIG. 11 illustrates the end of a step during which any movement of the validation tool causes an identical movement of the cursor and the virtual magnifier on the interface and which depends on the movement of the validation tool. It contains all the elements present in FIG. 7.

In this first alternative, a step is described during which at least one element of the interface is selected when a selection tool, different from the validation tool, is put onto the interface.

Figure 12:
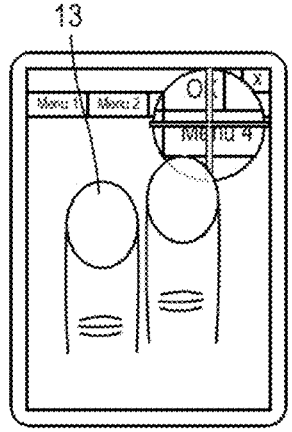
Figure 13:
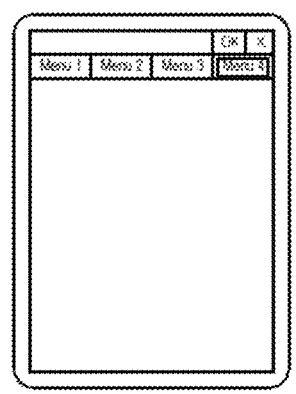

FIG. 12 contains all the elements of FIG. 10. Furthermore, the selection tool 13, different from the validation tool, is put onto the interface. This validation tool can for example be another finger of the user or a stylus. In other words, the element 4 is selected by putting another tool, a so called selection tool, rather than picking up the validation tool. Of course, the validation tool can then be picked up. Of course, the selection tool can then be picked up.

Besides, a specific selection can be generated according to a relative pressing position of the selection tool with respect to the validation tool. The specific generated selection can be a left click when the selection tool is on the left of the validation tool and/or a right click when the selection tool is on the right of the validation tool. The right and left are defined with respect to the reading direction of the user interface.

A second alternative, possibly combinable with the first alternative will now be described in reference to FIGS. 2 to 3, only for the differences of this alternative from the preceding description.

In this second alternative, the action of the initialisation tool triggering the display of the virtual magnifier onto the user interface comprises a sequence. This sequence comprises positioning the initialisation tool into an initialisation position (FIG. 2), and then picking up the initialisation tool (not illustrated), and then newly positioning the initialisation tool into the initialisation position (as illustrated in FIG. 2) or into an neighbouring position, that is not farther from the initialisation position than a certain remoteness threshold, stored by the electronic unit, typically equal to 5 mm from the initialisation position of the first positioning of the initialisation tool, this sequence being performed in a time period lower than a time interval threshold. Typically, the time interval threshold is substantially equal to 500 milliseconds. This time threshold is stored by the electronic unit.

The user can then continue the selection method by a step during which an action of a validation tool triggers a display in the magnifier of a cursor centred on the initialisation position (FIG. 3).

In other words, the method is initialized by a sequence comprising the steps of putting the initialisation tool, as in FIG. 2, into an initialisation position; and then picking it up, and then putting it again as in FIG. 2 not far from its initialisation position. This sequence is quickly performed and triggers the display of the magnifier 6, as illustrated in FIG. 3.

A third alternative, possibly combinable with the first alternative and/or the second alternative will now be described in reference to FIGS. 14 to 16, only for the differences of this alternative from the preceding description. In this alternative, FIGS. 14 to 16 replace FIGS. 4 to 6.

Figure 14:
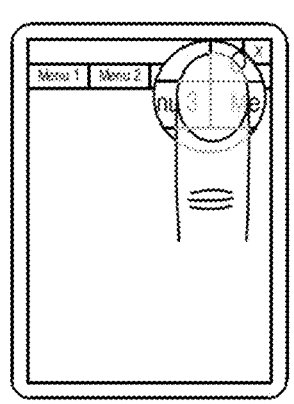
FIGS. 14 to 16 illustrate, in a method according to the invention, one of the alternatives of the invention for which the validation tool is different from the initialisation tool and for which the action triggering the display of the cursor comprises the action of putting the validation tool.

FIG. 14 is the same as FIG. 3, illustrating the end of a step during which an action of an initialisation tool, positioned into an initialisation position on the user interface, triggers the display of a virtual magnifier encompassing the initialisation position.

This third alternative is implemented following the step just reminded.

Figure 15:
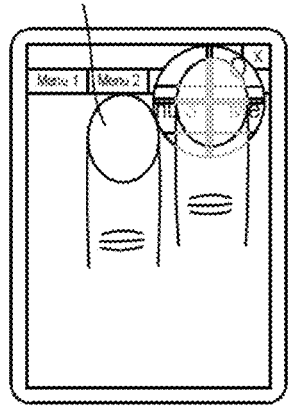

In this third alternative, the action of a validation tool which triggers a display in the magnifier of a cursor centred on the initialisation position comprises the action of putting a validation tool 14 which is different from the initialisation tool as illustrated in FIG. 15. This validation tool can for example be another finger of the user or even a stylus. It can be seen in FIG. 15 that the cursor 8 is displayed. This action can be followed by picking up the initialisation tool, as illustrated in FIG. 16. The user can then continue the selection method by implementing a step during which any movement of the validation tool causes a movement of the cursor and the virtual magnifier onto the interface and which depends on the movement of the validation tool.

Figure 16:
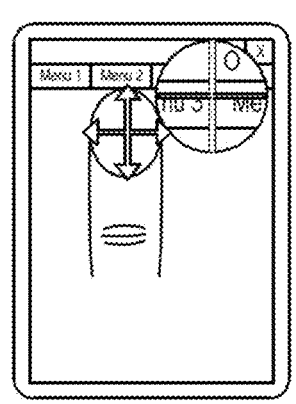

In other words, instead of moving the initialisation tool as has been described before, the user can put another validation tool and then pick up the initialisation tool to display the cursor 8, as shown in FIGS. 15 and 16.

In the first embodiment and its different alternatives, it can be noted that the initial position of the magnifier and the cursor is the same as the initialisation position. The cursor and the magnifier thus appear on the initialisation position originally targeted by the user (see FIG. 3) but it is later possible to overcome this drawback (see FIG. 8). Besides, no global zooming is used on a part of the user interface. That is, the zoomed part does not occupy the entire surface of the interface screen, which would disturb the user because he/she would lose the vision of the whole page. Finally, it is noted that the invention is generic because it does not presuppose the existence of elements at different scales.

The processing unit comprises means for receiving data from the screen, processing them and sending processed data on the screen, such as at least one microprocessor, an analog or digital electronic card and/or a mother board.

In this embodiment and its different alternatives, it is the processing unit that analyses any interaction of a tool with the touch screen and triggers any modification on the touch screen depending on this interaction. Without limiting thereto, the display, opening of a program are functions implemented thanks to this electronic processing and/or software means.

That is, it is the processing unit that, according to the alternative considered, is arranged to:
- trigger a display of a virtual magnifier encompassing an initialisation position on the user interface, by an action of an initialisation tool positioned into the initialisation position;
- trigger a display in the magnifier of a cursor centred on the initialisation position by an action of a validation tool;
- cause, for any movement of the validation tool, an identical movement of the cursor and the virtual magnifier onto the interface, said movement being dependent on the movement of the validation tool;
- select at least one element of the interface when the validation tool is picked up from the interface or when a selection tool is put onto the interface;
- detect positioning of the initialisation tool into an initialisation position;

detect picking up the initialisation tool;
detect new positioning the initialisation tool into the initialisation position or into a neighbouring position;
trigger the display of a virtual magnifier if positioning, picking up and new positioning are detected in a time period lower than a time interval threshold;
can further comprise means for determining a zooming factor of the magnifier as a function of a movement speed of the initialisation tool between the initialisation position and its position at the end of the action for triggering the display of the cursor.

The processing unit can implement operating systems such as iOS, Windows Mobile or even Android. Numerous program tools dedicated to these operating systems enable this embodiment and its different alternatives to be implemented. In particular, it is possible to install a software driver of the operating system which will intercept "screen touch" events and analyse them to determine whether the conditions required by the invention are fulfilled. As long as these events do not fulfill the conditions for triggering a particular behaviour related to the invention, these events are transmitted to the operating system. When a particular condition is detected (for example long touch), the driver will execute a particular code according to the case to make appear or move or disappear a magnifier or a cursor. The driver can also generate new events in response to detected conditions, for example "click". These events are transmitted to the operating system so as to trigger the action required by the invention. As regards the magnifier function itself, it can be made by reading in the video memory pixels surrounding the centre of the magnifier. The image formed by these pixels is scaled to be displayed as overlay on the screen.

Of course, the invention is not restricted to the examples just described and numerous alterations can be provided to these examples without departing from the scope of the invention.

The invention claimed is:

1. A method for selecting at least one element of a user interface on an electronic unit, comprising:
    positioning an initialization tool in an initialization position on the user interface;
    triggering a display of a virtual magnifier encompassing the initialization position when the initialization tool is positioned on the user interface;
    moving the initialization tool to a position on the user interface that is a distance from the initialization position, wherein when the distance is greater than a distance threshold, a validation tool triggers a display of a cursor in the magnifier that is centered on the initialization position;
    subsequent moving the validation tool causes an identical movement of the cursor and the virtual magnifier on the user interface that depends on the movement of the validation tool; and
    selecting at least one element of the user interface when the validation tool is picked up from the user interface or when a selection tool is put onto the user interface.

2. The method according to claim 1, wherein the user interface is a touch screen.

3. The method according to claim 1, wherein the movement of the cursor and of the virtual magnifier is a proportional movement to that of the validation tool.

4. The method according to claim 1, wherein the element to be selected is smaller than the virtual magnifier on the user interface.

5. The method according to claim 1, wherein the action of the initialization tool triggering the display of the virtual magnifier on the user interface comprises positioning the initialization tool into the same initialization position, during a time higher than a time threshold.

6. The method according to claim 1, wherein the action of the initialization tool triggering the display of the virtual magnifier on the user interface comprises a sequence, said sequence comprising:
    positioning the initialization tool into an initialization position, and
    picking up the initialization tool, and then
    newly positioning the initialization tool into the initialization position or in a neighboring position, this sequence being performed in a time period lower than a time interval threshold.

7. The method according to claim 1, wherein the validation tool is the same as the initialization tool.

8. The method according to claim 7, wherein a zooming factor of the magnifier is determined as a function of a movement speed of the initialization tool between the initialization position and its position at the end of the action triggering the display of the cursor.

9. The method according to claim 1, wherein the validation tool is different from the initialization tool and for which the action triggering the display of the cursor comprises the action of putting the validation tool on the user interface.

10. The method according to claim 1, wherein to select at least one element of the interface, a specific selection is generated depending on a relative pressing position of the selection tool with respect to the validation tool.

11. The method according to claim 10, wherein the generated specific selection is a left click when the selection tool is on the left of the validation tool.

12. The method according to claim 10, wherein the generated specific selection is a right click when the selection tool is on the right of the validation tool.

13. The method according to claim 1, wherein a magnifying factor of the virtual magnifier is strictly higher than 1.

14. A device for selecting at least one element of a user interface, the device comprising:
    a electronic unit including a display screen, said display screen configured to display a user interface:
    an initialization tool and a validation tool each associated with the electronic unit, wherein the initialization tool is positioned on an initialization position on the user interface and triggers a display of a virtual magnifier encompassing the initialization position on the user interface;
    a cursor displayed in the magnifier on the user interface and centered on the initialization position when the validation tool is moved a distance from the magnifier that is greater than a threshold distance, and a directional cross associated with the cursor that is spaced from the magnifier by an action of the validation tool,
    wherein the electronic unit causes, for any movement of the validation tool, an identical movement of the cursor and the virtual magnifier spaced from the validation tool on the user interface, said movement being dependent on the movement of the validation tool; and
    a selector associated with the electronic unit and configured for selecting at least one element of the user interface when the validation tool is picked up from the user interface or when a selection tool is put onto the user interface.

* * * * *